United States Patent
Schulz et al.

(10) Patent No.: US 10,479,725 B2
(45) Date of Patent: Nov. 19, 2019

(54) METHOD FOR PRODUCING A COMPOSITE PANE HAVING A CORROSION-PROTECTED FUNCTIONAL COATING

(71) Applicant: SAINT-GOBAIN GLASS FRANCE, Courbevoie (FR)

(72) Inventors: Valentin Schulz, Niederzier (DE); Irène Cucchi, Lille (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 108 days.

(21) Appl. No.: 15/531,428

(22) PCT Filed: Dec. 2, 2015

(86) PCT No.: PCT/EP2015/078354
§ 371 (c)(1),
(2) Date: May 27, 2017

(87) PCT Pub. No.: WO2016/096435
PCT Pub. Date: Jun. 23, 2016

(65) Prior Publication Data
US 2017/0327420 A1    Nov. 16, 2017

(30) Foreign Application Priority Data

Dec. 18, 2014  (EP) .................................. 14198940

(51) Int. Cl.
*B32B 3/10*    (2006.01)
*C03C 23/00*   (2006.01)
(Continued)

(52) U.S. Cl.
CPC ........ *C03C 23/0025* (2013.01); *B23K 26/351* (2015.10); *B23K 26/57* (2015.10);
(Continued)

(58) Field of Classification Search
None
See application file for complete search history.

(56) References Cited

U.S. PATENT DOCUMENTS 5,622,540 A    4/1997  Stevens
2002/0094407 A1  7/2002  Frost et al.
(Continued)

FOREIGN PATENT DOCUMENTS

DE    3403682 C1    8/1985
DE    4404159 C1    4/1995
(Continued)

OTHER PUBLICATIONS

Machine Translation of DE 4404159 Retrieved on Jan. 22, 2019.*
(Continued)

*Primary Examiner* — Christopher M Polley
(74) *Attorney, Agent, or Firm* — Pillsbury Winthrop Shaw Pittman LLP

(57) ABSTRACT

Methods and devices for producing a composite pane having a functional coating are presented. The functional coating is applied to part of a surface of a base pane, and a first pane is cut out from the base pane while introducing a frame-shaped peripheral coating-free region into the functional coating having an inner region that is not adjacent a side edge of the first pane. The surface of the first pane with the functional coating is then bonded via a thermoplastic intermediate layer to a surface of a second pane.

15 Claims, 9 Drawing Sheets

Figure 1A:
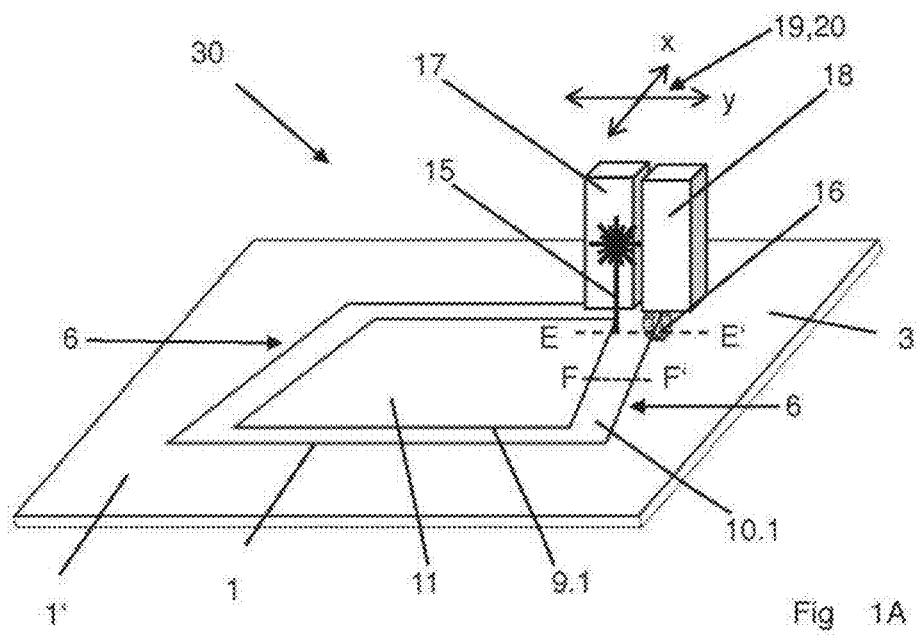

(51) Int. Cl.
*B32B 17/10* (2006.01)
*C03B 33/07* (2006.01)
*C03B 33/10* (2006.01)
*C03C 17/36* (2006.01)
*H05B 3/84* (2006.01)
*H05B 3/04* (2006.01)
*C03B 33/09* (2006.01)
*B23K 26/351* (2014.01)
*B23K 26/57* (2014.01)
*B32B 37/14* (2006.01)
*B23K 101/36* (2006.01)
*B23K 103/16* (2006.01)

(52) U.S. Cl.
CPC .. *B32B 17/10036* (2013.01); *B32B 17/10183* (2013.01); *B32B 17/10761* (2013.01); *B32B 37/14* (2013.01); *C03B 33/074* (2013.01); *C03B 33/091* (2013.01); *C03B 33/107* (2013.01); *C03C 17/36* (2013.01); *C03C 17/366* (2013.01); *C03C 17/3626* (2013.01); *C03C 17/3644* (2013.01); *C03C 17/3673* (2013.01); *H05B 3/04* (2013.01); *H05B 3/84* (2013.01); *B23K 2101/36* (2018.08); *B23K 2103/172* (2018.08); *B32B 2310/0843* (2013.01); *C03C 2217/214* (2013.01); *C03C 2217/256* (2013.01); *C03C 2217/281* (2013.01); *C03C 2217/73* (2013.01); *C03C 2218/156* (2013.01); *C03C 2218/328* (2013.01); *H05B 2203/008* (2013.01); *H05B 2203/011* (2013.01); *H05B 2203/016* (2013.01); *H05B 2203/017* (2013.01)

(56) References Cited

U.S. PATENT DOCUMENTS

| | | |
|---|---|---|
| 2004/0146645 A1 | 7/2004 | Freeman et al. |
| 2005/0016972 A1 | 1/2005 | Borgeson et al. |
| 2005/0056127 A1 | 3/2005 | Yamabuchi et al. |
| 2005/0221062 A1 | 10/2005 | Mann |
| 2005/0238861 A1 * | 10/2005 | Buhay ............... B32B 17/10036 428/212 |
| 2006/0137505 A1 | 6/2006 | Wakayama |
| 2007/0020465 A1 | 1/2007 | Thiel et al. |
| 2007/0082219 A1 | 4/2007 | Fleury et al. |
| 2010/0122969 A1 * | 5/2010 | Wagner ............... B23K 26/364 219/121.67 |
| 2011/0271591 A1 | 11/2011 | Walton et al. |
| 2012/0100400 A1 | 4/2012 | Kang et al. |
| 2015/0343884 A1 | 12/2015 | Rousselet et al. |

FOREIGN PATENT DOCUMENTS

| | | | |
|---|---|---|---|
| DE | 4404159 C1 * | 4/1995 | ........... C03B 33/107 |
| DE | 202008017611 U1 | 4/2010 | |
| DE | 102008058310 B3 | 6/2010 | |
| DE | 102011075328 A1 | 11/2012 | |
| DE | 202011110333 U1 | 8/2013 | |
| EP | 0517176 A1 | 12/1992 | |
| EP | 0847965 B1 | 6/1998 | |
| EP | 2139049 A1 | 12/2009 | |
| EP | 2200097 A1 | 6/2010 | |
| JP | H03-016927 A | 1/1991 | |
| JP | H05-070164 A | 3/1993 | |
| JP | H10-506087 A | 6/1998 | |
| JP | 2000-513698 A | 10/2000 | |
| JP | 2002182185 A | 6/2002 | |
| JP | 2005-519762 A | 7/2005 | |
| JP | 2005-525281 A | 8/2005 | |
| JP | 2009-516926 A | 4/2009 | |
| JP | 2011-144061 A | 7/2011 | |
| WO | 2003/024155 A2 | 3/2003 | |
| WO | 2003/040049 A1 | 3/2005 | |
| WO | 2004/041493 A1 | 3/2006 | |
| WO | 2007/057459 A1 | 5/2007 | |
| WO | 2012/052315 A1 | 4/2012 | |
| WO | 2014/060203 A1 | 4/2014 | |

OTHER PUBLICATIONS

International Search Report for International Application No. PCT/EP2015/078354 filed on Dec. 2, 2015 in the name of Saint-Gobain Glass France. (English translation and German original) dated Feb. 17, 2016. 6 pages.

Written Opinion for International Application No. PCT/EP2015/078354 filed on Dec. 2, 2015 in the name of Saint-Gobain Glass France (English translation and German original), dated Feb. 17, 2016. 10 pages.

* cited by examiner

Applying a functional coating (3) on the surface (III) of a base pane (1'), for example, by cathodic sputtering

Separating a first pane (1) from the base glass pane (1') by a cutting tool (18), and introducing at least one frame-shaped peripheral coating-free region (9.1) into the functional coating (3) by a decoating tool (17), wherein an inner region (11) of the functional coating (3) is completely separated from an outer region (9.1) of the functional coating (3) such that the inner region (11) is not adjacent a side edge (6) of the first pane (1),

Bonding the surface (III) of the first pane (1) with the functional coating via a thermoplastic intermediate layer (4) to a surface (II) of a second pane (2) under the action of heat, vacuum, and/or pressure

Fig 2

METHOD FOR PRODUCING A COMPOSITE PANE HAVING A CORROSION-PROTECTED FUNCTIONAL COATING

CROSS REFERENCE TO RELATED APPLICATIONS

The present application is the U.S. national stage entry of International Patent Application No. PCT/EP2015/078354, filed internationally on Dec. 2, 2015, which, in turn, claims priority to European Patent Application No. 14198940.0, filed on Dec. 18, 2014.

The invention relates to a method for producing a composite pane with a corrosion-protected functional coating as well as a device for carrying out the method according to the invention.

Composite panes comprising two or more glass or polymeric panes are used in many ways in buildings, furniture, or in means of transportation for travel on land, in the air, or on water, in particular in motor vehicles, for example, as a windshield, rear window, side window, and/or roof panel.

Often, one or a plurality of functional coatings, which have, for example, infrared reflecting properties, antireflection properties, or low-E properties, or are electrically heatable through the application of a voltage, are arranged on individual sides of the panes. Such composite panes are known, for example, from US 2004/0146645 A1, US 2005/0238861 A1, or WO 2014/060203 A1. Methods for processing and, in particular, for decoating panes with functional coatings are known, for example, from DE 34 03 682 C1, DE 10 2008 058 310 B3, DE 10 2011 075 328 A1, or EP 0 517 176 A1.

Furthermore, composite panes that have an electrical heating layer made of a transparent, electrically conductive coating on an inside surface of one of the individual panes are known. By means of an external voltage source, an electrical current that heats the coating and, hence, the pane can be conducted through the electrically conductive coating.

WO 2003/024155 A2, US 2007/0082219 A1, US 2007/0020465 A1, and WO2012/052315 A1 disclose, for example, such a heatable, electrically conductive coating based on a metal and, in particular, based on a layer structure of one or plurality of silver-containing layers.

Such functional coatings and, in particular, metal-based and electrically conductive coatings are quite susceptible to corrosion and must, consequently, be hermetically sealed and protected against moisture. For this purpose, an inner functional coating is decoated along a peripheral frame-shaped region of the composite pane. The width of the peripheral frame-shaped region is customarily from 5 mm to 20 mm and ends at the side edge of the composite pane. Customarily, the decoating is done in a complicated and lengthy process by mechanical abrasion, for example, by grinding with a grinding wheel. The coating-free region is hermetically sealed in the interior of the composite pane by the thermoplastic intermediate layer and/or an acrylic adhesive as a vapor diffusion barrier. By means of the vapor diffusion barrier, the corrosion-sensitive functional coating is protected against moisture and atmospheric oxygen. If the composite pane is provided as a motor vehicle pane, for example, as an electrically heatable windshield, the peripheral coating-free region also effects electrical isolation between the voltage-carrying coating and the vehicle body.

The object of the present invention consists in providing an improved method for producing a composite pane with a corrosion-protected functional coating that can be carried out simply, quickly, and, consequently, economically.

The object of the present invention is accomplished according to the invention by a method as claimed in the independent method claim. Preferred embodiments emerge from the subclaims.

The method according to the invention for producing a composite pane with a functional coating comprises at least the following steps:

(a) Applying a functional coating on at least part of a surface (III) of a base pane, (b) Cutting out a first pane from the base pane using a cutting tool and introducing at least one coating-free region into the functional coating using a decoating tool, wherein the coating-free region completely surrounds an inner region of the functional coating, (c) Bonding the surface (III) of the first pane with the functional coating to a surface (II) of a second pane via a thermoplastic intermediate layer.

In other words, the coating-free region is arranged frame-shaped peripherally around the inner region and the inner region is not adjacent a side edge of the first pane.

For the method according to the invention, it is particularly important for the cutting out of the first pane and the decoating of the coating-free region to be done in one process step and, hence, simultaneously.

In prior art methods, first, the first pane is cut out of the base pane and, in a second process step, a wide area is edge-decoated by mechanical abrasion. This second process step is very time-consuming and requires its own process station and is thus very expensive.

In the method according to the invention, a process station is eliminated as a result of simultaneous cutting and decoating, and the process is thus accelerated. It is particularly advantageous for the decoating tool and the cutting tool to be coordinated with one another: Thus, the decoating process must be adapted in its speed to the speed of movement of the cutting tool. Particularly good results have been obtained for a cutting wheel, preferably made of a hard metal, as a cutting tool and a laser beam as a decoating tool. In particular, by the appropriate choice of the laser power and of the width of the decoated region, a desired speed adaptation can easily be achieved.

The cutting tools and, preferably, the cutting wheel or the diamond tip are advantageously cooled with a cooling fluid. The cooling fluid is preferably a known cutting oil customary in the trade. The cooling fluid is typically introduced, injected, or sprayed on between the cutting edge or tip of the cutting tool and the surface of the base pane and wets a region of the surface of the base pane.

In an advantageous embodiment of the method according to the invention, in step (b), the coating-free region is designed such that the inner region is partially or completely surrounded by at least one outer region of the functional coating and is separated therefrom by the coating-free region.

In the following, "base pane" refers to a pane that is larger in its dimensions than the first pane and from which the first pane is formed after being cut out.

The cutting out of the first pane from the base pane in step (b) can also consist in cutting into or scoring a surface of the base pane, with the first pane subsequently broken out of the base pane, for example, by a slight mechanical load. With brittle materials such as glass, this can be carried out particularly precisely and quickly.

The application of the functional coating in process step (a) can be done by methods known per se, preferably by magnetic field enhanced cathodic sputtering. This is particularly advantageous in terms of simple, fast, economical, and uniform coating of the base pane. However, the functional coating can also be applied, for example, by vapor deposition, chemical vapor deposition (CVD), plasma enhanced chemical vapor deposition (PECVD), or by wet chemical methods.

The first pane can be subjected to a temperature treatment after process step (a) and/or process step (b). Here, the first pane with the functional coating is heated to a temperature of at least 200° C., preferably at least 300° C. The temperature treatment can serve to increase the transmittance and/or to reduce the sheet resistance of the functional coating.

The first pane can be bent after process step (a) or after process step (b), typically at a temperature of 500° C. to 700° C. Since it is technically simpler to coat a flat pane, this approach is advantageous when the first pane is to be bent. However, alternatively, the base pane can also be bent before process step (a), for example, when the functional coating is not suitable to withstand a bending process without damage.

The decoating of individual coating-free regions in the functional coating in process step (b) is preferably be done by a laser beam. Methods for patterning thin metal films are known, for example, from EP 2 200 097 A1 or EP 2 139 049 A1.

The introduction of energy for decoating the coating-free region can be done according to the invention with any suitable laser. Particularly preferably used are YAG lasers, in particular Nd:YAG lasers (neodymium-doped yttrium-aluminum-garnet solid-state lasers) with a wavelength in the range from 1047 to 1079 nm (nanometers), preferably of 1064 nm. Further preferred is a Yb:YAG laser (ytterbium-doped yttrium-aluminum-garnet solid-state laser) with a wavelength in the range of 1030 nm. In advantageous improvements, both laser types can be used with frequency doubling (doubled) or frequency tripling (tripled).

In an alternative embodiment according to the invention, YAG lasers are used for decoating the functional coating, in particular with a high pulse repetition frequency in the pico- and nano-second range. The decoating quality is very good and the functional coating is substantially completely removed. In particular, with the use of a glass substrate as a first pane, the surface is free of microcracks and has low optical scattering as well as high strength in the 2-point flexure test.

Alternatively, particularly suitable for the decoating of the functional coating are $CO_2$ lasers, in particular $CO_2$ lasers with a wavelength in the range from 9.2 μm to 11.4 μm, preferably of 10.6 μm or a frequency doubled $CO_2$ laser. This can be a pulsed $CO_2$ laser or a continuous-wave $CO_2$ laser (cw laser).

For carrying out the method according to the invention, with the use of a $CO_2$ laser, in particular in terms of the decoating speed, an average laser power PAV of less than 500 W, preferably of less than 300 W, particularly preferably of less than 200 W is suitable. With respect to the decoating quality, an average laser power of less than 100 W, which is conducive to the formation of good decoating quality, is preferable; but the decoating speed therewith is low.

For carrying out the method according to the invention, with the use of a pulsed $CO_2$ laser, an average laser pulse repetition frequency $f_{rep}$ of 5 to 12 kHz (kilohertz) is preferred, in particular an average laser pulse repetition frequency $f_{rep}$ of 8 to 10 kHz. Furthermore, with the use of a pulsed $CO_2$ laser, a laser pulse duration $t_p$ of 0.1 to 500 μs (microseconds) is preferred, in particular a laser pulse duration $t_p$ of 1 to 100 μs.

Furthermore, an excimer laser, in particular an $F_2$ laser (157 nm), ArF laser (193 nm), KrF laser (248 nm), or an Ar laser (351 nm) is preferred. Such laser types can, depending on the embodiment of the invention, be used as pulsed or continuous wave lasers.

In an advantageous embodiment of the method according to the invention, in step (b), a laser beam is guided directly onto the coated surface III of the first pane for the laser ablation. This has the advantage that a cutting tool for cutting the first pane out of a larger base pane can be arranged near the laser and can be moved simultaneously therewith. This significantly simplifies the device for producing the composite pane according to the invention.

In an alternative advantageous embodiment of the method according to the invention, in step (b), for the laser ablation, a laser beam is launched into the first pane through the surface facing away from the coated surface Ill of the first pane and, thus, guided through the first pane onto the functional coating. This has the particular advantage that ablated or vaporized material cannot enter the path of the laser beam and, thus, cannot deflect, scatter, or attenuate it. This results in higher accuracy in the ablation process.

In a particularly advantageous embodiment of the method according to the invention, the cutting tool and the laser beam are moved simultaneously. The cutting tool is guided over the surface of the base pane, on which the functional coating is arranged. The laser beam is launched into the base pane through the surface facing away from the coated surface of the base pane and guided through the base pane onto the functional coating. Particularly preferably, the laser beam is guided in a region of the functional coating covered by the cooling fluid. This has the particular advantage that vaporized material of the functional coating cannot move freely through the device and, thus, also cannot precipitate onto adjacent regions of the base pane. The material removed from the surface is bound in the cooling fluid and can be removed from the coated surface of the first pane with the cooling fluid, for example, in a typically following washing step. With such a process, particularly high quality panes can be produced.

In process step (c), the first pane is arranged such that the one of its surfaces that is provided with the functional coating faces the thermoplastic intermediate layer. The surface thus becomes the inside surface of the first pane.

The thermoplastic intermediate layer can be formed by a single intermediate layer or even by two or more intermediate layers that are arranged areally one over another.

The bonding of the first and second pane in process step (c) is preferably done under the action of heat, vacuum, and/or pressure. Methods known per se for producing a composite pane can be used.

For example, so-called autoclave methods can be performed at an elevated pressure of roughly 10 bar to 15 bar and temperatures from 130° C. to 145° C. over roughly 2 hours. Vacuum bag or vacuum ring methods known per se operate, for example, at roughly 200 mbar and 80° C. to 110° C. The first pane, the thermoplastic intermediate layer, and the second pane can also be pressed in a calender between at least one pair of rollers to form a composite pane. Systems of this type for producing composite panes are known and normally have at least one heating tunnel upstream from a pressing facility. The temperature during the pressing operation is, for example, from 40° C. to 150° C. Combinations of calender and autoclave methods have particularly proven their value in practice. Alternatively, vacuum laminators can be used. These consist of one or a plurality of heatable and evacuable chambers, in which the first pane and the second pane are laminated within, for example, roughly 60 minutes at reduced pressures of 0.01 mbar to 800 mbar and temperatures from 80° C. to 170° C.

The invention further includes a device for carrying out the method according to the invention. The device according to the invention comprises at least:
- a cutting tool for cutting out or scoring a first pane out of a base pane,
- a decoating tool for introducing a coating-free region into a functional coating on the base pane, and
- a moving device for moving the cutting tool and the decoating tool.

In an advantageous embodiment, the cutting tool includes a cutting wheel, preferably made of a hard metal, a diamond tip, or a hard metal tip. Particularly preferably, the cutting tool is cooled with a cooling fluid, in particular in the region of contact with the base pane. In an alternative advantageous embodiment, the cutting tool includes a laser beam.

It is also understood that in the case of a base pane made of a brittle material such as glass, the cutting tool only cuts into or scores it and the first pane is subsequently broken out of the base pane, for example, by a slight mechanical load.

In another advantageous embodiment, the decoating tool includes a laser beam. A laser beam is particularly advantageous in order to effect complete, quick, and, consequently, economical decoating.

In another advantageous embodiment, the moving device includes a robot or a multi-axis handling device and preferably an X-Y positioning table. In an advantageous embodiment, the decoating tool and the cutting tool are connected to one another or are moved simultaneously with one another by the same moving device. This makes the device according to the invention particularly simple and economical.

In an advantageous embodiment of the device according to the invention, the decoating tool includes a laser beam. The decoating tool and the cutting tool are arranged on opposite sides of a plane in which the base pane is arranged. The device is thus constituted such that the cutting tool can process a surface of the base pane and the laser beam enters through the opposite surface of the base pane into the base pane and strikes the functional coating through it. The base pane is turned with the surface on which the functional coating is arranged facing the cutting tool such that the laser beam can penetrate through the surface opposite the coated surface into the base pane. The cutting tool and the laser beam are guided such that the laser beam, after passing through the base pane, emerges in a region of the functional coating that is covered by the cooling fluid. The laser beam strikes the boundary between the base pane and the functional coating, while the side of the functional coating facing away from the boundary is covered with the cooling fluid. This has—as already stated above —the particular advantage that removed components of the functional coating are bound in the cooling fluid and can be washed away later.

The invention further includes a composite pane with a functional coating produced with the method according to the invention, wherein the composite pane comprises at least the following characteristics:
- a first pane with a surface III, a second pane with a surface II, and a thermoplastic intermediate layer, wherein the surface III of the first pane is areally bonded via the thermoplastic intermediate layer to the surface II of the second pane.
- at least one functional coating, which is applied at least on part of the inner surface III of the first pane,
- at least one coating-free region, which completely surrounds an inner region of the functional coating.

This results in the fact that he inner region is not adjacent a side edge of the first pane.

In an advantageous embodiment, the coating-free region is at least partially or preferably completely surrounded by an outer region of the functional coating. In other words, the inner region and the coating-free region are arranged at least partially and preferably completely inside the outer region of the functional coating.

Here, "completely surrounded" means that the coating-free region is completely surrounded by a frame-shaped peripheral outer region of the functional coating.

The outer region of the functional coating can, in turn, be at least partially and preferably completely surrounded by another coating-free region and this can, in turn, be partially and preferably completely surrounded by another outer region of the functional coating.

In the context of the invention, there is no material connection of the material of the functional coating between the inner region and the side edge of the first pane or between the inner region and an outer region or a plurality of outer regions. The coating-free region and the functional coating in the inner region are hermetically sealed by the intermediate layer during the lamination operation for producing the composite pane. Thus, moisture from the surroundings of the composite pane can no longer reach the inner region of the functional coating, and the functional coating in the inner region is effectively protected against corrosion.

In an advantageous embodiment of the composite pane according to the invention, the coating-free region is strip-shaped and is arranged substantially parallel to the side edges of the first pane. This has special advantages from a process technology standpoint since the decoating tool can be guided parallel to the cutting tool and thus parallel to the side edge and along the entire first pane. The reliable material separation of the inner region from the surroundings of the composite pane is ensured by intersecting coating-free regions in the corner regions of the first pane.

This means that the coating-free region is substantially completely surrounded by a frame-shaped peripheral region of the functional coating of the outer region. In addition, there are extension elements of the strip-shaped coating-free region that connect the frame-shaped peripheral coating-free region inside the outer region to the side edges of the first pane. Since these extension elements are also hermetically sealed by the intermediate layer in the finished composite pane, this has no effect on the corrosion resistance of the functional coating.

In another advantageous embodiment of the composite pane according to the invention, the width b of the outer area or areas is from 0.5 mm to 30 mm and preferably from 3 mm to 11 mm. The width is defined here as the dimension orthogonal to the edge of the inner region. Such widths b are particularly advantageous since, on the one hand, they enable reliable corrosion protection and, on the other, they can be concealed by a black or decorative print or by the vehicle body.

In a particularly advantageous embodiment of the composite pane according to the invention, the outer region surrounds the inner region by more than 70% and preferably by more than 90% of the length of the perimeter of the inner region. In other words, the outer region is excluded in just a few zones, such as coating-free communication windows or in the region of supply lines to the busbars.

In another advantageous embodiment of the composite pane according to the invention, a first coating-free region is completely surrounded by a second coating-free region. The outer region with a functional coating is thus arranged between the first and the second coating-free region. Particularly preferably, the second coating-free region is completely surrounded by a third coating-free region. In other words, another, second outer region with a functional coating is arranged between the second and the third coating-free region. By means of such a second or third coating-free region, particularly good moisture protection and, hence, particularly good corrosion protection are obtained.

In another advantageous embodiment of the composite pane according to the invention, the width d of the coating-free region is from 30 µm to 30 mm, preferably from 100 µm to 2 mm, and particularly preferably from 250 µm to 1.5 mm, and in particular from 250 µm to 500 µm. This has the particular advantage that coating-free regions with such a small width can be produced very quickly and simply.

The coating-free regions can be produced by any suitable technical method. Decoating by laser ablation is particularly preferred. This has the particular advantage that it can be carried out economically, quickly and precisely. Due to its precision, laser ablation is particularly suitable for narrow widths d.

In principle, all electrically insulating substrates that are thermally and chemically stable as well as dimensionally stable under the conditions of the production and use of the pane according to the invention are suitable as the first and second pane.

The first pane and/or the second pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethylmethacrylate, polystyrene, polyamide, polyesters, polyvinylchloride, and/or mixtures thereof. The first pane and/or the second pane are preferably transparent, in particular for the use of the pane as a windshield or a rear window of a vehicle or other uses in which high light transmittance is desired. In the context of the invention, "transparent" means a pane that has transmittance greater than 70% in the visible spectral range. For panes that are not in the traffic-relevant field of vision of the driver, for example, for roof panels, the transmittance can, however, also be much lower, for example, greater than 5%.

The thickness of the individual panes can vary widely and thus be ideally adapted to the requirements of the individual case. Preferably, panes with the standard thicknesses of 1.0 mm to 25 mm, preferably of 1.4 mm to 2.5 mm for motor vehicle glass and preferably of 4 mm to 25 mm for furniture, appliances, and buildings, in particular for electric heaters, are used. The size of the pane can vary widely and is governed by the size of the use according to the invention. The first pane and, optionally, the second pane have, for example, in the automotive industry and the architectural sector, usual areas of 200 cm$^2$ up to 20 m$^2$.

The composite pane can have any three-dimensional shape. Preferably, the three-dimensional shape has no shadow zones such that it can, for example, be coated by cathodic sputtering. Preferably, the substrates are planar or slightly or greatly curved in one or a plurality of spatial directions. In particular, planar substrates are used. The panes can be colorless or colored.

Multiple individual panes are bonded to one another via at least one intermediate layer. The intermediate layer preferably contains at least one thermoplastic plastic, preferably polyvinyl butyral (PVB), ethylene vinyl acetate (EVA), and/or polyethylene terephthalate (PET). The thermoplastic intermediate layer can, however, also contain, for example, polyurethane (PU), polypropylene (PP), polyacrylate, polyethylene (PE), polycarbonate (PC), polymethylmethacrylate, polyvinylchloride, poly acetate resin, casting resins, acrylates, fluorinated ethylene propylene, polyvinyl fluoride, and/or ethylene tetrafluoroethylene, or copolymers or mixtures thereof. Intermediate layers with relatively poor adhesion properties can also be arranged and laminated between intermediate layers with better adhesion properties, for example, PVB/PET/PVB. The thermoplastic intermediate layer can be formed by one or even by a plurality of thermoplastic films arranged one above another, wherein the thickness of one thermoplastic film is preferably from 0.25 mm to 1 mm, typically 0.38 mm or 0.76 mm.

In a composite pane according to the invention composed of a first pane, a thermoplastic intermediate layer, and a second pane, the functional coating is applied directly onto the first pane. The first pane and the second pane have, in each case, an inside surface and an outside surface. The inside surfaces of the first and the second pane are turned toward one another and bonded to one another via the thermoplastic intermediate layer. The outside surfaces of the first and the second pane are turned away from one another and from the thermoplastic intermediate layer. The functional coating is applied onto the inside surface of the first pane. Of course, another functional coating can also be applied on the inside surface of the second pane. Even the outside surfaces of the panes can have coatings. The terms "first pane" and "second pane" are selected to distinguish between the two panes in a composite pane according to the invention. No information concerning the geometric arrangement is associated with the terms. If the pane according to the invention is provided, for example, in an opening, for example, of a motor vehicle or of a building, to separate the interior from the external environment, the first pane can face the interior or the external environment.

The functional coating is preferably transparent. Here, "transparent" means permeable to electromagnetic radiation, preferably electromagnetic radiation of a wavelength from 300 nm to 1.300 nm and in particular to visible light. Thus, in the context of the invention, a composite pane with a functional coating that has transmittance greater than 70% in the visible spectrum is understood to be "transparent". For panes that are not located in the traffic-relevant field of vision of the driver, for example, roof panels, the transmittance can, however, also be much lower lower, for example, greater than 5%.

If the functional coating is used for electrical heating of the composite pane, it is implemented as an electrically conductive functional coating and preferably as a transparent, electrically conductive functional coating.

Electrically conductive functional coatings according to the invention are known, for example, from DE 20 2008 017 611 U1, EP 0 847 965 B1, or WO2012/052315 A1. They typically include one functional layer or a plurality of, for example, two, three, or four, electrically conductive functional layers. The functional layers preferably include at least one metal, for example, silver, gold, copper, nickel, and/or chromium, or a metal alloy. The functional layers particularly preferably include at least 90 wt.-% of the metal, in particular, at least 99.9 wt.-% of the metal. The functional layers can be made of the metal or the metal alloy. The functional layers particularly preferably include silver or a silver-containing alloy. Such functional layers have particularly advantageous electrical conductivity with simultaneously high transmittance in the visible spectral range. The thickness of a functional layer is preferably from 5 nm to 50 nm, particularly preferably from 8 nm to 25 nm. In this range for the thickness of the functional layer, advantageously high transmittance in the visible spectral range and particularly advantageous electrical conductivity are obtained.

Typically, at least one dielectric layer is arranged in each case between two adjacent functional layers of the functional coating. Preferably, another dielectric layer is arranged below the first and/or above the last functional layer. A dielectric layer includes at least one individual layer made of a dielectric material, for example, including a nitride such as silicon nitride or an oxide such as aluminum oxide. The dielectric layer can, however, also comprise multiple individual layers, for example, individual layers of a dielectric material, smoothing layers, adaptation layers, blocker layers, and/or antireflection layers. The thickness of a dielectric layer is, for example, from 10 nm to 200 nm.

This layer structure is generally obtained by a succession of deposition operations that are performed by a vacuum method such as magnetic-field enhanced cathodic sputtering.

Other suitable functional coatings preferably include indium tin oxide (ITO), fluorine-doped tin oxide ($SnO_2$:F), or aluminum-doped zinc oxide (ZnO:Al).

A functional coating used as an electrical heating layer can, in principle, be any coating that can be electrically contacted. If pane according to the invention is intended to enable vision through it, as is, for example, the case with panes in the window sector, the functional coating is preferably transparent.

In an advantageous embodiment, the functional coating is a layer or a layer structure of a plurality of individual layers with a total thickness less than or equal to 2 µm, particularly preferably less than or equal to 1 µm.

An advantageous functional coating according to the invention, which is used as an electrical heating layer, has a sheet resistance from 0.4 ohm/square to 10 ohm/square.

In a particularly preferred embodiment, the functional coating according to the invention has a sheet resistance from 0.5 ohm/square to 1 ohm/square. Coatings with such sheet resistances are particularly suited for heating motor vehicle window panes with typical onboard voltages of 12 V to 48 V or in electric vehicles with typical onboard voltages of up to 500 V.

In an advantageous embodiment, the composite pane according to the invention has at least two busbars provided for connecting to a voltage source, which are connected to an electrically conductive functional coating and preferably to a transparent, electrically conductive functional coating such that a current path for a heating current is formed between the busbars.

The busbars are preferably arranged along the upper and lower side edges of the inner region of the electrically conductive functional coating. The length of the busbar is typically substantially the same as the length of the inner region, but can also be smaller. Also, more than two busbars can be arranged on the electrically conductive functional coating, preferably in the edge region along two opposite side edges of the inner region. Also, more than two busbars can be arranged on the functional coating, for example, to form two or more independent heating fields in a functional coating or when the busbar is interrupted or displaced by one or more uncoated zones.

In an advantageous embodiment, the busbar according to the invention is implemented as a printed-on and fired conductive structure. The printed-on busbar preferably contains at least a metal, a metal alloy, a metal compound, and/or carbon, particularly preferably a noble metal and, in particular, silver. The printing paste preferably contains metallic particles, metal particles, and/or carbon and, in particular, noble metal particles, such as silver particles. The electrical conductivity is preferably achieved by means of the electrically conducting particles. The particles can be situated in an organic and/or inorganic matrix, such as pastes or inks, preferably as printing paste with glass frits.

The width of the first and second busbar is preferably from 2 mm to 30 mm, particularly preferably from 4 mm to 20 mm and, in particular, from 10 mm to 20 mm. Thinner busbars result in excessively high electrical resistance and, hence, in excessively high heating of the busbar during operation. Furthermore, thinner busbars can be produced only with difficulty using printing techniques such as screen printing. Thicker busbars require undesirably high material usage. Furthermore, they result in an excessively great and unaesthetic restriction of the see-through region of the pane. The length of the busbar it is governed by the dimensions of the electrical heating layer. With a busbar that is typically implemented in the form of a strip, the longer of its dimensions is referred to as length and the less long of its dimensions is referred to as width. The third or additional busbars can be designed even thinner, preferably from 0.6 mm to 5 mm.

The layer thickness of the printed-on busbar is preferably from 5 µm to 40 µm, particularly preferably from 8 µm to 20 µm, and most particularly preferably from 8 µm to 12 µm. Printed-on busbars with these thicknesses are technically easy to realize and have advantageous current carrying capacity.

The specific resistance $\rho_a$ of the busbars is preferably from 0.8 µohm·cm to 7.0 ||ohm·cm and particularly preferably from 1.0 µohm·cm to 2.5 µohm·cm. Busbars with specific resistances in this range are technically easy to realize and have advantageous current carrying capacity.

Alternatively, the busbar can be implemented as a strip of an electrically conductive film. The busbar then includes, for example, at least aluminum, copper, tinned copper, gold, silver, zinc, tungsten, and/or tin or alloys thereof. The strip preferably has a thickness from 10 µm to 500 µm, particularly preferably from 30 µm to 300 µm. Busbars made of electrically conductive foils with these thicknesses are technically easy to realize and have advantageous current carrying capacity. The strip can be electrically conductively connected to the electrically conductive structure, for example, via a soldering compound, via an electrically conductive adhesive, or by direct placement.

The functional coating can extend over the entire surface of the first pane. Alternatively, however, the functional coating can extend over only part of the surface of the first pane. The functional coating preferably extends over at least 50%, particularly preferably over at least 70%, and most particularly preferably over at least 90% of the inside surface of the first pane. The functional coating can have one or a plurality of uncoated zones in the inner region and/or in the outer region. These zones can be permeable to electromagnetic radiation and are, for example, known as data transmission windows or communication windows.

The electrical supply line is preferably implemented as a flexible foil conductor (flat conductor, flat-band conductor). This means an electrical conductor whose width is significantly greater than its thickness. Such a foil conductor is, for example, a strip or a band, containing or made of copper, tinned copper, aluminum, silver, gold, or alloys thereof. The foil conductor has, for example, a width of 2 mm to 16 mm and a thickness of 0.03 mm to 0.1 mm. The foil conductor can have an insulating, preferably polymeric sheath, for example, based on polyimide. Foil conductors that are suitable for the contacting of electrically conductive coatings in panes have a total thickness of, for example, only 0.3 mm. Such thin foil conductors can be embedded without difficulty between the individual panes in the thermoplastic intermediate layer. A plurality of conductive layers electrically isolated from one another can be situated in a foil conductor band.

Alternatively, thin metal wires can also be used as the electrical supply line. The metal wires contain, in particular, copper, tungsten, gold, silver, or aluminum or alloys of at least two of these metals. The alloys can also contain molybdenum, rhenium, osmium, iridium, palladium, or platinum.

The invention further includes the use of the composite pane with the functional coating produced in accordance with the method according to the invention in buildings, in particular in the access area, window area, roof area, or façade area, as a built-in part in furniture and appliances, in means of transportation for travel on land, in the air, or on water, in particular in trains, ships, and motor vehicles, for example, as a windshield, rear window, side window, and/or roof panel.

In the following, the invention is explained in detail with reference to drawings and exemplary embodiments. The drawings are a schematic representation and not true to scale. The drawings in no way restrict the invention.

Figure 1B:
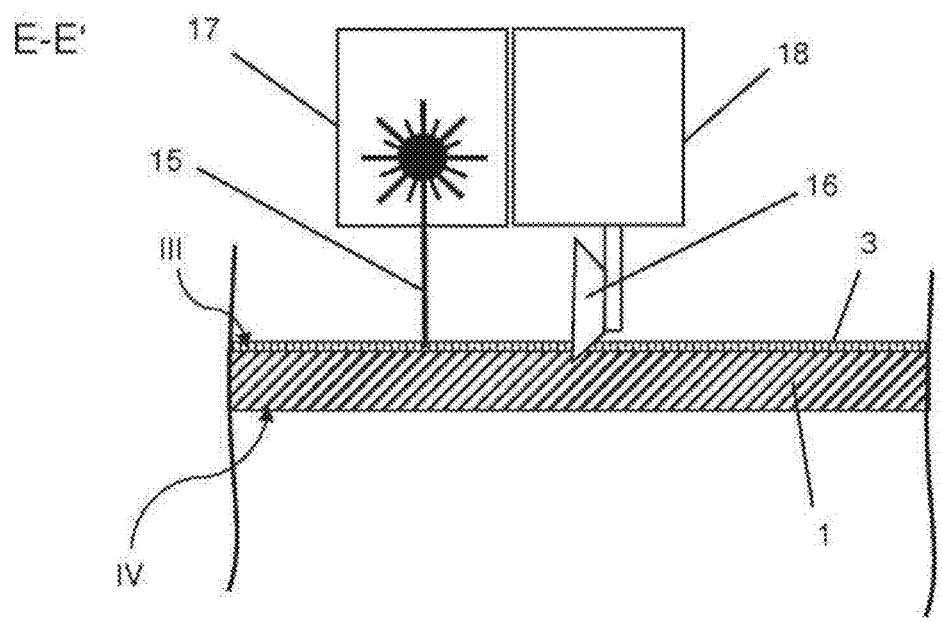
Figure 1C:
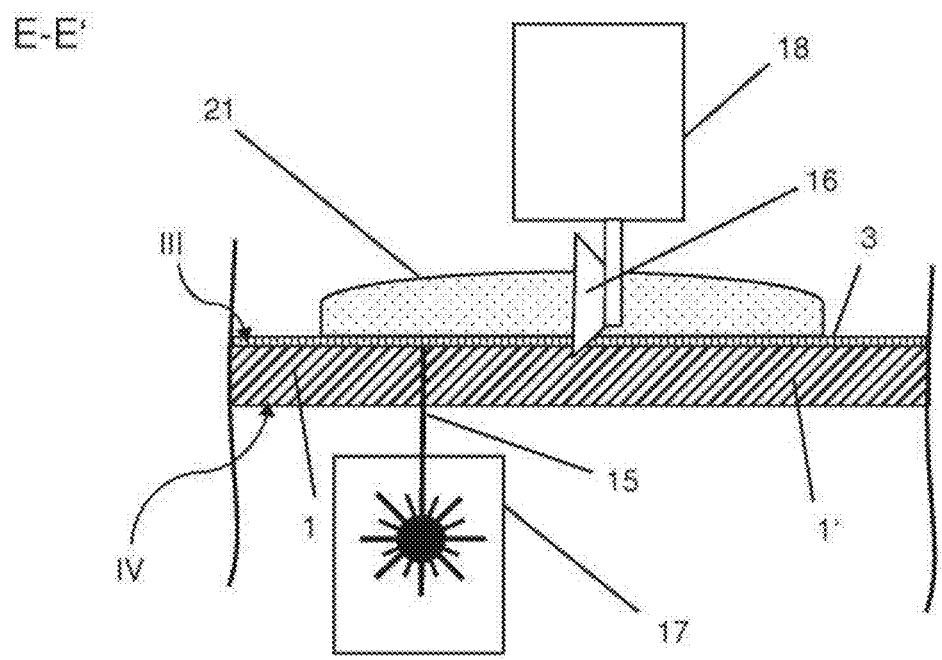
Figure 3A:
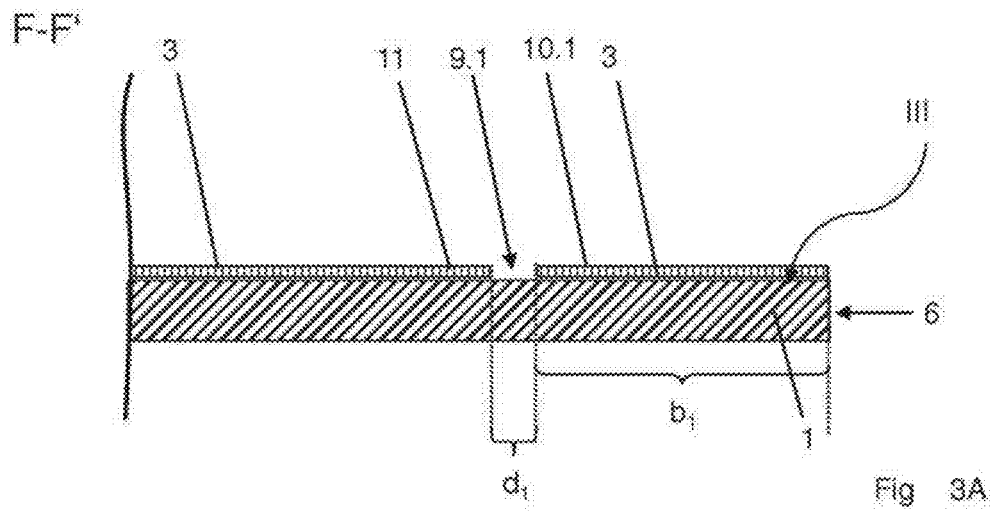
Figure 3B:
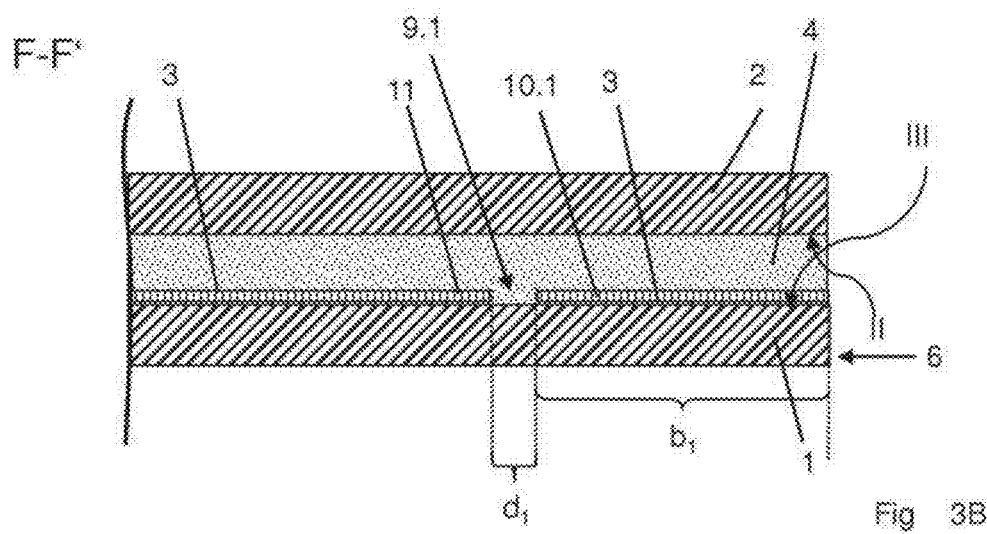
Figure 4A:
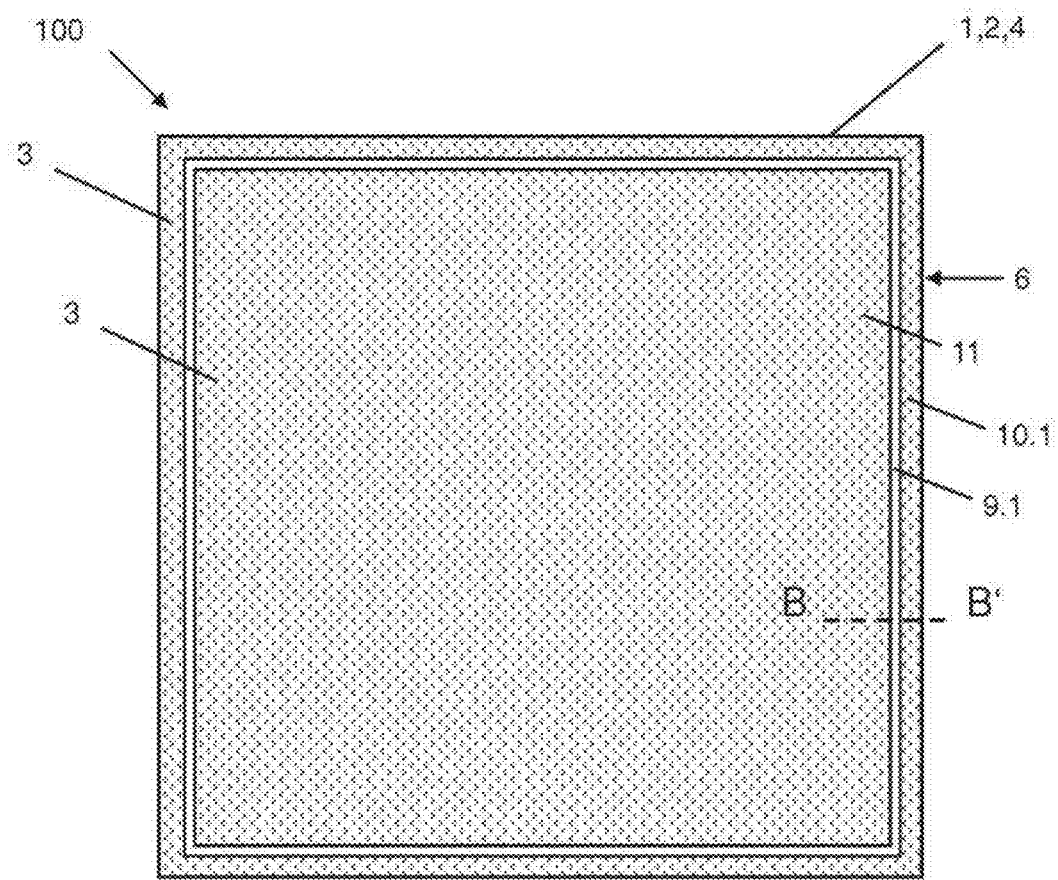
Figure 4B:
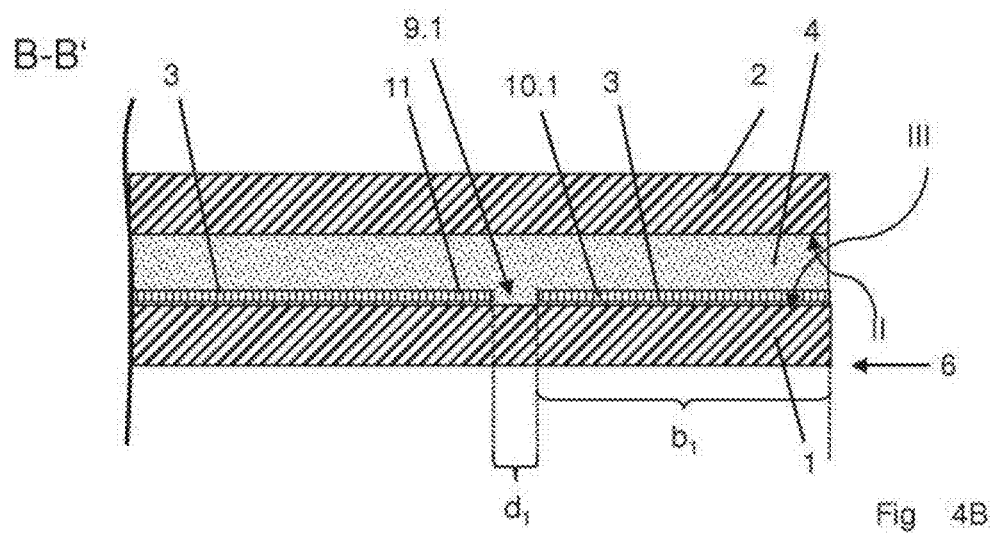
Figure 5A:
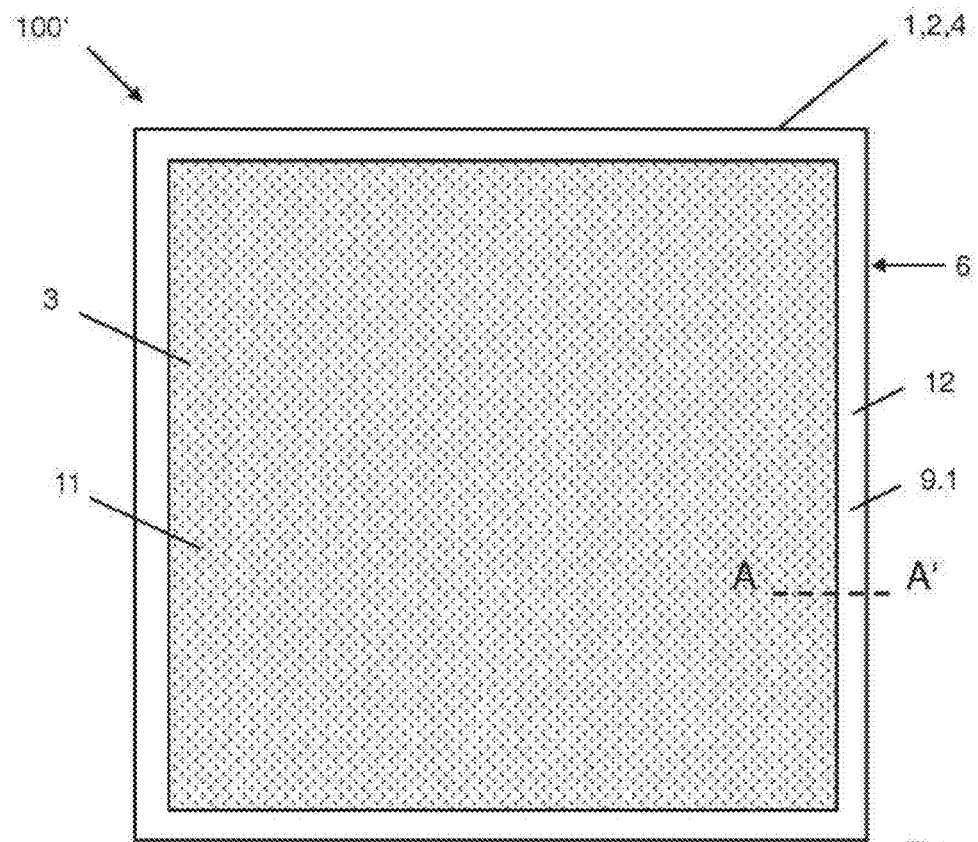
Figure 5B:
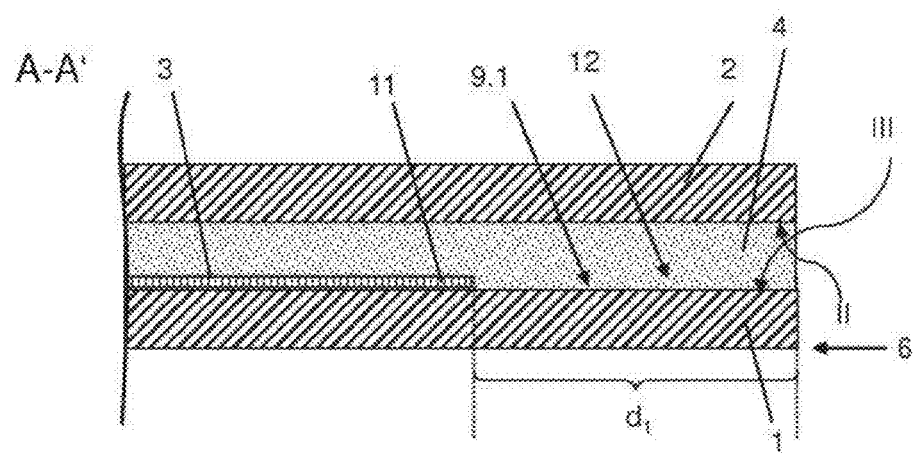
Figure 6A:
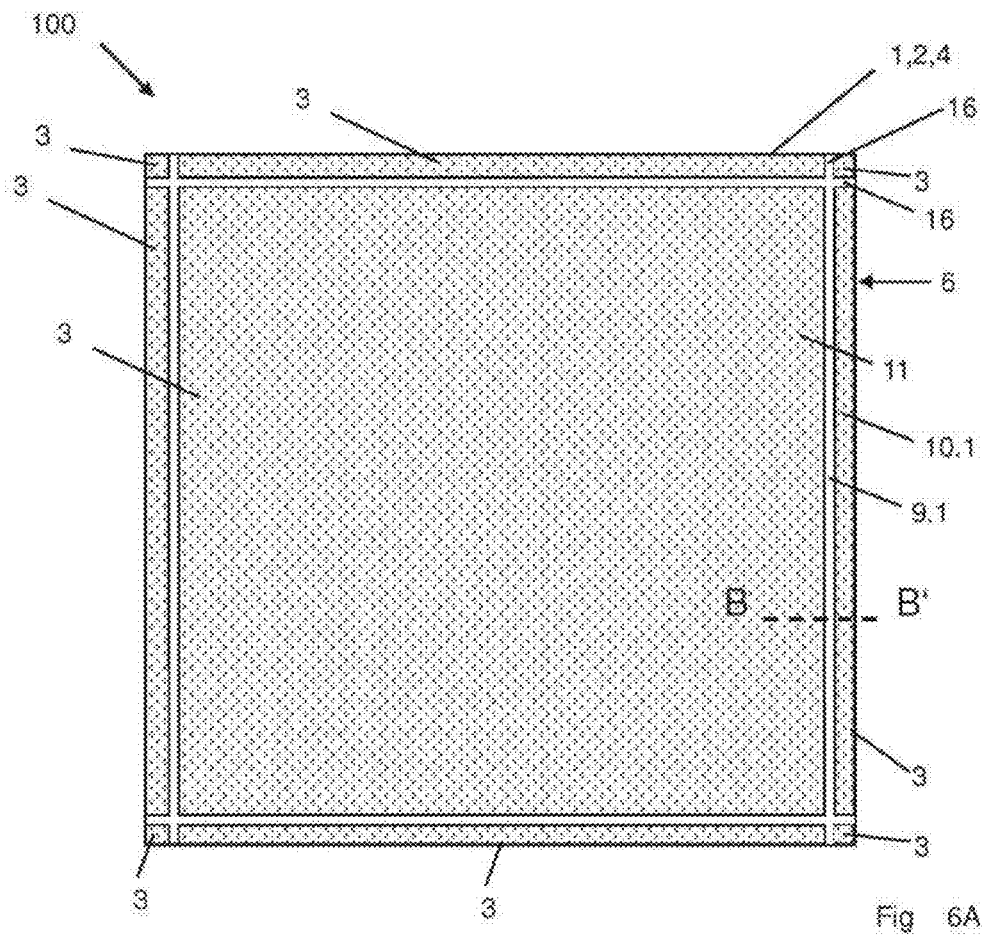
Figure 6B:
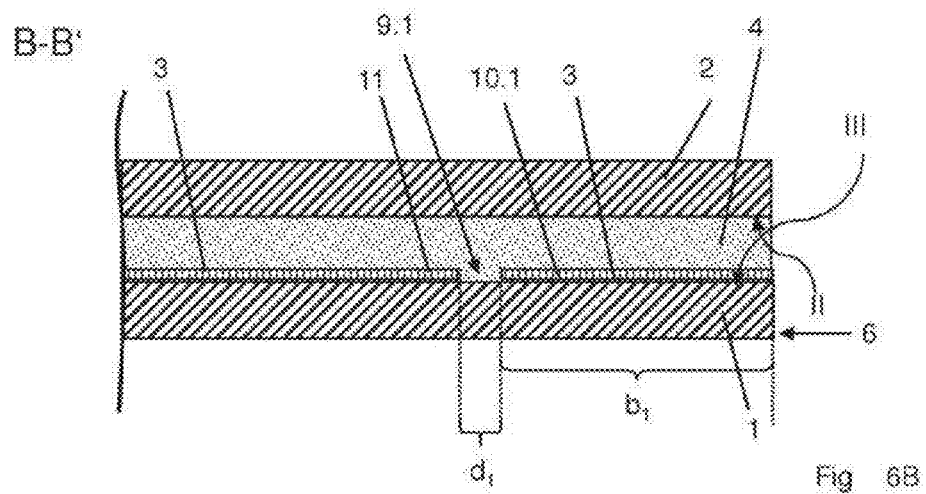
Figure 7A:
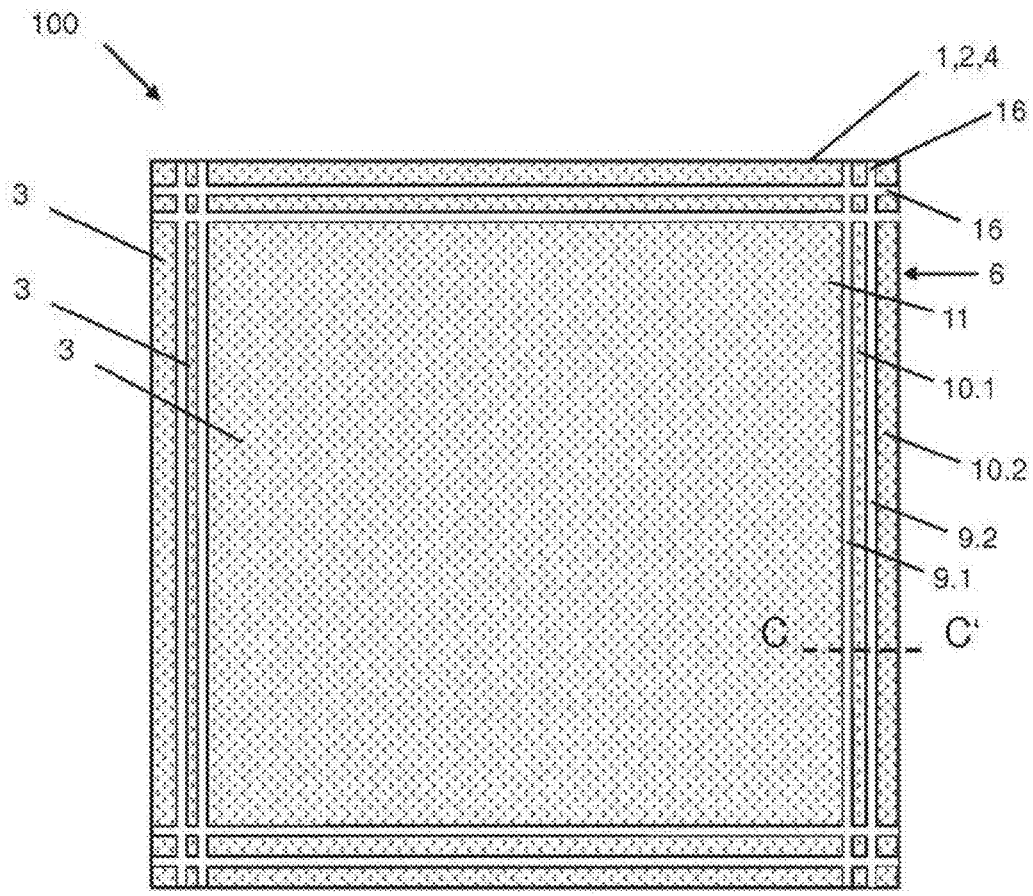
Figure 7B:
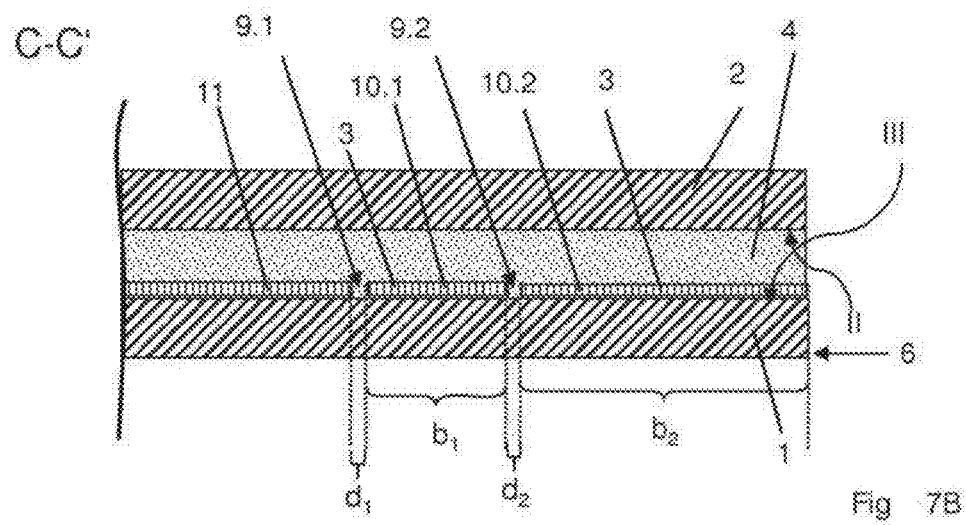
Figure 8A:
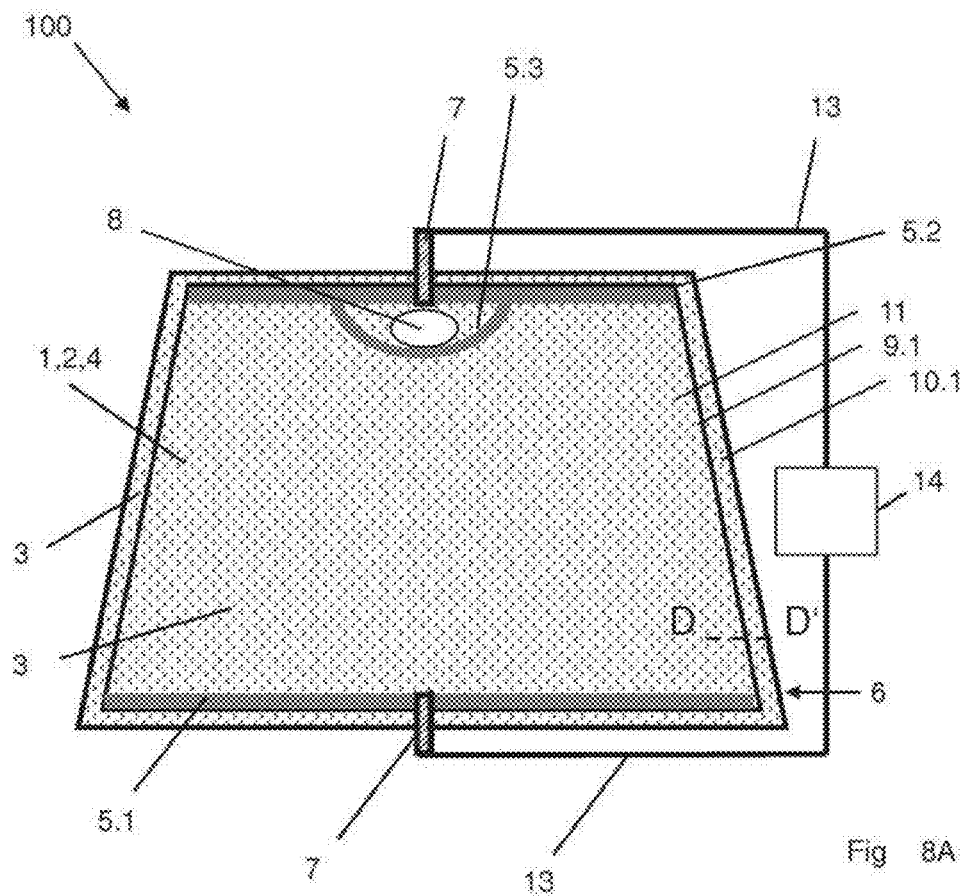
Figure 8B:
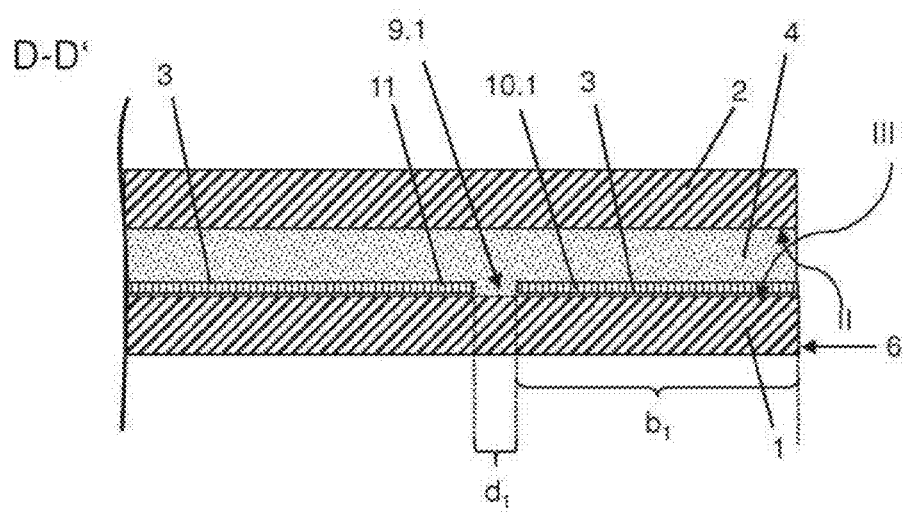

They depict:

FIG. 1A a perspective view of a schematic representation of a device according to the invention for carrying out the method according to the invention;

FIG. 1B a cross-sectional view along the section line E-E' of a base pane 1' of FIG. 1A;

FIG. 1C a cross-sectional view of an alternative device according to the invention for carrying out the method according to the invention along the section line E-E' of a base pane 1' based on FIG. 1A:

FIG. 2 a detailed flowchart of an embodiment of the method according to the invention;

FIG. 3A a cross-sectional view along the section line F-F' of a first pane 1 of FIG. 1A after step (b) of the method according to the invention;

FIG. 3B a cross-sectional view along the section line F-F' of a first pane 1 of FIG. 1A after step (c) of the method according to the invention;

FIG. 4A a plan view of an embodiment of a composite pane with a functional coating according to the invention, FIG. 4B a cross-sectional view along the section line B-B' of the composite pane according to the invention of FIG. 4A, FIG. 5A a plan view of an alternative embodiment of a composite pane with a functional coating according to the invention, FIG. 5B a cross-sectional view along the section line A-A' of the composite pane of FIG. 5A, FIG. 6A a plan view of another embodiment of the composite pane with a functional coating according to the invention, FIG. 6B a cross-sectional view along the section line B-B' of the composite pane according to the invention of FIG. 6A, FIG. 7A a plan view of another embodiment of the composite pane with a functional coating according to the invention, FIG. 7B a cross-sectional view along the section line C-C' of the composite pane according to the invention of FIG. 7A, FIG. 8A a plan view of another embodiment of the composite pane with a functional coating according to the invention, FIG. 8B a cross-sectional view along the section line D-D' of the composite pane according to the invention of FIG. 8A, FIG. 1A depicts a perspective view of a schematic representation of a device 30 according to the invention for carrying out the method according to the invention. The device 30 includes a cutting tool 18 for cutting out a first pane 1 from a larger pane, which is referred to in the following as the base pane 1'. A functional coating 3 is arranged on the base pane 1'.

FIG. 1B depicts a cross-sectional view of the device 30 according to the invention of FIG. 1A along a cutting plane, that runs parallel to the section line E-E' and orthogonal to the base pane 1'.

The cutting tool 18 is, in this example, a cutting wheel 16 made of a hard metal. It is understood that other cutting tools 18 such as a diamond needle or a laser can also be used. It is likewise understood that the cutting tool 18, in the case of a base pane 1' made of glass, only cuts into it or scores it and the first pane 1 subsequently breaks out of the base pane 1', for example, by means of a slight mechanical load.

The device 30 further includes a decoating tool 17 for introducing a coating-free region 9.1 into the functional coating 3. The decoating tool 17 is, in this example, a laser beam 15. The laser beam 15 is guided onto the functional coating 3 on the surface III of the base pane 1'. There, the functional coating 3 is ablated under the action of the laser beam 15, for example, by vaporization.

It is understood that the decoating tool 17 can also be a grinding wheel or another suitable tool.

The device 30 according to the invention further includes a moving device 19 with which the cutting tool 18 and the decoating tool 17 can be moved. In this example, the moving device 19 is an X-Y positioning table 20, which simultaneously displaces tools 18,19 in the plane of the base pane 1'. Any other suitable device can be used as moving device 19, for example, a multi-axis handling device or a robot.

Likewise, the decoating tool 17 and, in particular, the laser can be arranged on the other side of the base pane 1' such that the laser beam 15 is guided through the first pane 1 and only then strikes the functional coating 3. This arrangement has the particular advantage that vaporized material of the functional coating 3 cannot enter the path of the laser beam 15 such that the beam is not scattered and is not weakened, and higher patterning accuracy is achieved.

FIG. 1C depicts an alternative embodiment of a device according to the invention for carrying out the method according to the invention. In this case, the decoating tool 17 is a laser, which is arranged on the side of the base pane 1' opposite the cutting tool 18 in comparison with FIG. 1B such that the laser beam 15 is guided through the first pane 1 and only then strikes the functional coating 3. Preferably, the cutting wheel 16 of the cutting tool 18 is cooled together with a region of the functional coating 3 with a cooling fluid 21, for example, a cutting oil, which wets at least a region of the functional coating 3. Advantageously, the laser beam 15 passes through the first pane 1 onto the functional coating 3, which is wetted with the cooling fluid 21 on the side facing away from the first pane 1. The laser beam 15 can be guided immediately adjacent the contact point between the cutting wheel 16 and the functional coating 3, or following a track, which leaves behind the cooling fluid on the functional coating 3 after the processing with the cutting wheel 16. This arrangement has the particular advantage that vaporized material of the functional coating 3 is bound by the cooling fluid 21 and, hence, cannot diffuse through the arrangement or be deposited on adjacent sections of the functional coating 3. Typically, the cooling fluid 21 remaining on the surface of the first pane 1 is washed off in another process step and, with it, the ablated material of the functional coating 3 bound in the cooling fluid 21 is also removed.

FIG. 2 depicts a flowchart of an exemplary embodiment of the method according to the invention for producing a composite pane 100 with a functional coating 3.

In step (a), a functional coating 3 is applied on the surface Ill of a base pane 1', for example, by cathodic sputtering.

In step (b), a first pane 1 is cut out or scored from the base pane 1' by a cutting tool 18, and at least one frame-shaped peripheral coating-free region 9.1 is introduced by a decoating tool 17 into the functional coating 3, wherein on the first pane 1, an inner region 11 of the functional coating 3 is completely separated from an outer region 10.1 of the functional coating 3 such that the inner region 11 is not adjacent a side edge 6 of the first pane 1.

In step (c), the surface Ill of the first pane 1 with the functional coating 3 is bonded via a thermoplastic intermediate layer 4 to a surface II of a second pane 2.

FIG. 3A depicts a cross-sectional view along the section line F-F' of the first pane 1 after process step (b). In a coating-free region 9.1, the functional coating 3 is completely removed over a width $d_1$. The functional coating 3 is thus divided into an inner region 11 and an outer region 10.1. This means that there is no longer a material connection of the material of the functional coating 3 of the inner region 11 to the outer region 10.1.

Then, in step (c), the first pane 1 is bonded to a second pane 2 via a thermoplastic intermediate layer 4 using customary lamination processes, for example, in the autoclave. FIG. 3B depicts the laminated composite pane 100 that was prepared in accordance with the method according to the invention.

FIG. 4A depicts a plan view of an exemplary embodiment of a composite pane 100 with a functional coating 3 according to the invention. FIG. 4B depicts a cross-sectional view along the section line B-B' of the composite pane according to the invention 100 of FIG. 4A. The composite pane 100 comprises a first pane 1, a second pane 2, and a thermoplastic intermediate layer 4, which areally bonds the surface III of the first pane 1 to the surface 11 of the second pane 2. The first pane 1 and the second pane 2 are made, for example, of soda lime glass. The thickness of the first pane 1 is, for example, 1.6 mm and the thickness of the second pane 2 is 2.1 mm. The thermoplastic intermediate layer 4 is made, for example, of polyvinyl butyral (PUB) and has a thickness of 0.76 mm. The dimensions of the composite pane 100 are, for example, 1 m×1 m.

A functional coating 3 of a transparent electrically conductive coating, which can, for example, serve as an infrared reflecting layer or an electrical heating layer, is applied on the surface III of the first pane 1. The functional coating 3 is a layer system, which includes, for example, three electrically conductive silver layers that are separated from one another by dielectric layers.

The functional coating 3 extends, for example, over the entire surface III of the first pane 1 minus a frame-shaped peripheral coating-free region 9.1, which separates an inner region 11 of the functional coating 3 completely from an outer region 10.1 of the functional coating 3. This means that the inner region 11 is not adjacent a side edge 6 of the first pane 1. In the example depicted here, the frame-shaped peripheral coating-free region 9.1 has the shape of a rectangular and, in this case, square decoated line with a width $d_1$, which is set back into the pane interior over the complete perimeter by a distance $b_1$ from the side edge 6 of the composite pane 100. The distance $b_1$ is, in this case, the width of the outer region 10.1 and is, for example, 5 mm. The width $d_1$ of the coating-free region 9.1 is, for example, constant and is, for example, 300 µm. This arrangement prevents the inner region 11 of the functional coating 3 from being adjacent the side edge 6 of the first pane 1. In the composite pane 100, the functional coating 3 is thus prevented from having direct access to the atmosphere outside the composite pane 100. By means of the lamination of the first pane 1 and the second pane 2 with the intermediate layer 4, the coating-free region 9.1 is completely filled with the material of the intermediate layer 4, and the inner region 11 is hermetically sealed. The functional coating 3 in the inner region 11 is thus effectively protected against moisture and, hence, against corrosion. As investigations of the inventors surprisingly revealed, a width $d_1$ of only 30 µm suffices to protect the functional coating 3 in the inner region 11 against corrosion. It is understood that even more sections of the functional coating 3 can be coating-free within the inner region 11 or the outer region 10.1, without the above-described effect of corrosion protection according to the invention being impaired. The narrow coating-free region 9.1 can, for example, be produced by laser decoating of the functional coating 3. This has the particular advantage that the composite pane 100 according to the invention can be produced quickly and economically.

FIG. 5A depicts a plan view of an alternative embodiment of a composite pane 101 according to the invention. FIG. 5B depicts a cross-sectional view along the section line A-A' of the composite pane of FIG. 5A. The basic structure of the composite pane 101 corresponds in the materials and the dimensions of the composite pane 100 according to the invention of FIG. 4A and FIG. 4B. The composite pane 101 likewise has a functional coating 3, which is arranged on the surface Ill of the first pane 1.

In contrast to the composite pane 100 according to the invention of FIG. 4 A and FIG. 4B, the composite pane 101 has, in the edge region 12 of the first pane 1, a coating-free region 9.1 with a width $d_1$ of 15 mm, which extends all the way to the pane edge 6. In other words, the composite pane 101 has no outer region 9.1 made of a functional coating 3:

FIG. 6A depicts a plan view of an alternative embodiment of a composite pane 100 according to the invention with a functional coating 3. FIG. 6B depicts a cross-sectional view along the section line B-B' of the composite pane 100 according to the invention of FIG. 6A. The structure of the composite pane 100 of FIG. 6A and FIG. 6B corresponds substantially to the structure of the composite pane 100 of FIG. 4A and 4B such that, in the following, only the differences between the two composite panes 100 are described.

The functional coating 3 likewise extends, as in the example of FIG. 4A, over the entire surface III of the first pane 1 minus a frame-shaped peripheral coating-free region 9.1, which completely separates an inner region 11 of the functional coating 3 from an outer region 10.1 of the functional coating 3 such that the inner region 11 is not adjacent a side edge 6 of the first pane 1. In contrast to FIG. 4A, in the example of FIG. 6A, the coating-free region 9.1 is formed by strips that run parallel to the side edges 6 of the first pane 1. The strips intersect in each case in the corner regions of the first pane 1. A frame-shaped peripheral region that corresponds to the coating-free region 9.1 and that completely separates the functional coating 3 from the side edge 6 of the first pane 1 is created by the intersecting strips. Thus, in the finished composite pane 100, the functional coating 3 in the inner region 11 is hermetically sealed from the surroundings of the composite pane 100 and is protected against moisture penetrating from outside. In contrast to the exemplary embodiment of FIG. 4A, the coating-free region 9.1 in FIG. 6A has extension elements 16 that extend the coating-free region 9.1 all the way to the side edge 6 in the corner regions of the first pane. Since these are also hermetically sealed after lamination with the thermoplastic intermediate layer 4, here, again, no moisture can reach the functional coating 3 in the inner region 11. Coating-free regions 9.1 made of such parallel running strips can be produced particularly simply from a production technology standpoint, for example, by parallel guidance of a decoating tool for the decoating of the coating-free region 9.1, such as a laser, to another tool that cuts out the first pane 1 from a larger base pane or scores it for separation.

FIG. 7A depicts a plan view of an alternative embodiment of a composite pane 100 according to the invention with a functional coating 3. FIG. 7B depicts a cross-sectional view along the section line C-C' of the composite pane 100 according to the invention of FIG. 7A. The structure of the composite pane 100 of FIG. 7A and FIG. 7B corresponds substantially to the structure of the composite pane 100 of FIG. 6A and 6B such that, in the following, only the differences between the two composite panes 100 are described.

The composite pane 100 depicted in this example has, in addition to the coating-free region 9.1, other coating-free regions 9.2, which is framed by the coating-free region 9.1. The coating-free region 9.2 has, for example, a width $d_2$ of 100 μm and a distance $b_2$ from the coating-free region 9.1 of 2 mm. Both coating-free regions 9.1, 9.2 are formed by strips running parallel to the side edge 6 of the first pane 1, which intersect in the corners of the first pane 1 in each case and have extension elements 16. This means that the inner region 11 of the functional coating 3 of the first pane 1 is separated from the side edge 6 at least by a decoated region 9.1 of the width $d_1$ and a decoated region 9.2 of the width $d_2$. In the finished composite pane 1, this results in a widened and, thus, improved separation of the inner region 11 from the atmosphere surrounding the composite pane 100 and, thus, in improved protection against moisture and, thus, against corrosion.

FIG. 8A depicts a plan view of another exemplary embodiment of a composite pane 100 according to the invention with a functional coating 3 in the form of an electrical heating layer. The composite pane 100 comprises a first pane 1 and a second pane 2, which are bonded to one another via a thermoplastic intermediate layer 4. The composite pane 100 is, for example, a motor vehicle pane and, in particular, the windshield of a passenger car. The first pane 1 is, for example, intended to face the interior in the installed position. The first pane 1 and the second pane 2 are made of soda lime glass. The thickness of the first pane 1 is, for example, 1.6 mm and the thickness of the second pane 2 is 2.1 mm. The thermoplastic intermediate layer 4 is made of polyvinyl butyral (PVB) and has a thickness of 0.76 mm. A functional coating 3 made of an electrically conductive coating that can be used as an electrical heating layer is applied on the inside surface III of the first pane 1. The functional coating 3 is a layer system that includes, for example, three electrically conductive silver layers that are separated from one another by dielectric layers. When a current flows through this electrically conductive functional coating 3, it is heated as a result of its electrical resistance and Joule heating. Consequently, the functional coating 3 can be used for active heating of the composite pane 100.

The functional coating 3 extends, for example, over the entire surface III of the first pane 1 minus a peripheral frame-shaped coating-free region 9.1 with a width $d_1$ of 100 μm. The coating-free region 9.1 is offset into the pane interior by a distance $b_1$ of, for example, 5 mm from the pane edge 6. Here, the coating-free region 9.1 has two technical functions: it serves for the electrical insulation between the car body and the voltage-carrying functional coating 3 when it is heated electrically. Furthermore, the coating-free region 9.1 is hermetically sealed by adhesive bonding to the intermediate layer 4 and protects the functional coating 3 in the inner region 11 against damage and moisture and, hence, against corrosion.

For the electrical contacting of the functional coating 3 serving as an electrical heating layer, a first busbar 5.1 is arranged in the lower edge region and a second busbar 5.2 is arranged in the upper edge region of the inner region 11 on the functional coating 3 in each case. The busbars 5.1, 5.2 include, for example, silver particles and were applied in the screen printing method and then fired. The length of the busbars 5.1, 5.2 corresponds approx. to the dimension of the inner region 11 of the functional coating 3.

When an electrical voltage is applied on the busbars 5.1 and 5.2, a uniform current flows through the electrically conductive functional coating 3 between the busbars 5.1, 5.2. A supply line 7 is arranged approx. centrally on each busbar 5.1, 5.2. The supply line 7 is a foil conductor known per se. The supply line 7 is electrically conductively connected to the busbar 5.1, 5.2 via a contact surface, for example, using a soldering compound, an electrically conductive adhesive, or by simple placement and contact pressure inside the composite pane 100. The foil conductor includes, for example, a tinned copper foil with a width of 10 mm and a thickness of 0.3 mm. Via the electrical supply lines 7, the busbars 5.1, 5.2 are connected via connecting cables 13 to a voltage source 14 that provides an onboard voltage typical for motor vehicles, preferably from 12 V to 15 V and, for example, roughly 14 V. Alternatively, the voltage source 14 can also have higher voltages, for example, from 35 V to 50 V and, in particular, 42 V or 48 V.

It is understood that the functional coating 3 can also have, in addition to the heating function, further functions, such as infrared reflection or low-E properties.

An uncoated zone 8 is arranged in the composite pane 100, roughly centrally to the pane width. The uncoated zone 8 has no electrically conductive material of the functional coating 3. Here, the uncoated zone 8 is, for example, completely surrounded by the functional coating 3. Alternatively, the uncoated zone 8 can be arranged on the edge of the functional coating 3. The area of the uncoated zone 8 is, for example, 1.5 dm². On its lower end, the uncoated zone 8 is adjacent an additional busbar 5.3 that borders the uncoated zone 8 on the bottom. The uncoated zone 8 serves, for example, as a communication, sensor, or camera window.

The busbars 5.1, 5.2, 5.3 have, in the example depicted, a constant thickness of, for example, roughly 10 μm and a constant specific resistance of, for example, 2.3 μohm·cm.

The composite panes 100, 101 produced in accordance with the method according to the invention were subjected to customary corrosion tests.

a) a moisture test at a temperature of 70° C. and a relative humidity of 100% for a period of 300 hours, as well as b) an alternating climate test with 20 cycles of 12-hour duration each at a relative humidity of 85% and a temperature change from 85° C. to −40° C.

c) a salt spray test at a temperature of 35° C. for 960 hours with an aqueous sodium chloride solution All composite panes 100,101 produced according to the invention demonstrate very good corrosion resistance in the above-mentioned corrosion tests.

LIST OF REFERENCE CHARACTERS

1 first pane
2 second pane
3 functional coating
4 thermoplastic intermediate layer
5.1,5.2,5.3 busbar
6 side edge of the first pane 1
7 supply line
8 uncoated zone, communication window
9.1,9.2 coating-free region
10.1,10.2 outer region
11 inner region
12 edge region
13 connecting cable
14 voltage source
15 laser beam
16 cutting wheel
17 decoating tool
18 cutting tool
19 moving device
20 X-Y positioning table
21 cooling fluid
30 device according to the invention
100,101 composite pane according to the invention
II surface of the second pane 2
III inner surface of the first pane 1
IV outer surface of the first pane 1
A-A', B-B', C-C', D-D', E-E', F-F' section line
$b_1$, $b_2$ width of the outer region 10.1,10,2
$d_1$, $d_2$ width of the coating-free region 9.1,9.2
x,y direction

The invention claimed is:

1. A method for producing a composite pane having a functional coating, the method comprising:
   a) applying a functional coating to part of a surface of a base pane;
   b) cutting out a first pane from the base pane via a cutting tool with a cutting wheel and a cooling fluid while introducing at least one coating-free region into the functional coating via a decoating tool with a laser beam, the decoating tool moving simultaneously with the cutting tool,
   wherein
      the at least one coating-free region completely surrounds an inner region of the functional coating and separates the inner region from an outer region that partially or completely surrounds the inner region,
      the cutting wheel is guided directly on a coated surface of the first pane, and
      the laser beam is directed onto the first pane through a surface of the first pane facing away from the coated surface of the first pane and is guided through the first pane onto the functional coating in a region covered by the cooling fluid; and
   c) bonding, via a thermoplastic intermediate layer, a surface of the first pane having the functional coating to a surface of a second pane.

2. The method according to claim 1, wherein the coating-free region is strip-shaped and is arranged substantially parallel to side edges of the first pane.

3. The method according to claim 1, wherein a width of the coating-free region is from 30 µm to 30 mm.

4. The method according to claim 3, wherein the width is from 100 µm to 2 mm.

5. The method according to claim 3, wherein the width is from 250 µm to 1.5 mm.

6. The method according to claim 3, wherein the width is from 250 µm to 500 µm.

7. The method according to claim 1, wherein the inner region of the functional coating is partially or completely surrounded by at least one outer region of the functional coating.

8. The method according to claim 7, wherein a width of the outer region is from 0.5 mm to 30 mm.

9. The method according to claim 7, wherein a width of the outer region is from 3 mm to 11 mm.

10. The method according to claim 1, wherein the at least one coating-free region comprises a first coating-free region and a second coating-free region, the first coating-free region being completely bordered by the second coating-free region.

11. The method according to claim 10, wherein the at least one coating-free region further comprises a third coating-free region, the second coating-free region being completely bordered by the third coating-free region.

12. The method according to claim 1, wherein at least one of the first pane and the second pane contains glass or polymers.

13. The method according to claim 12, wherein the glass comprises a material selected from the group consisting of: a) flat glass, b) float glass, c) quartz glass, d) borosilicate glass, and e) soda lime glass.

14. The method according to claim 12, wherein the polymers comprise one or more materials selected from the group consisting of: a) polyethylene, b) polypropylene, c) polycarbonate, and d) polymethylmethacrylate.

15. The method according to claim 1, wherein the functional coating contains a material selected from the group consisting of: silver (Ag), indium tin oxide (ITO), fluorine-doped tin oxide ($SnO_2$:F), and aluminum doped zinc oxide (ZnO:Al).

* * * * *